US008577904B2

(12) United States Patent
Marston (10) Patent No.: US 8,577,904 B2
(45) Date of Patent: Nov. 5, 2013

(54) COMPOSITE COPY AND PASTE FOR COMPOSITE USER INTERFACES

(75) Inventor: Cayce B. Marston, Bedford, NH (US)

(73) Assignee: International Business Machines Corporation, Armonk, NY (US)

( * ) Notice: Subject to any disclaimer, the term of this patent is extended or adjusted under 35 U.S.C. 154(b) by 861 days.

(21) Appl. No.: 12/632,052

(22) Filed: Dec. 7, 2009

(65) Prior Publication Data

US 2011/0138283 A1 Jun. 9, 2011

(51) Int. Cl.
G06F 17/30 (2006.01)
(52) U.S. Cl.
USPC ............ 707/756; 707/793; 707/811; 715/724
(58) Field of Classification Search
USPC ........... 707/756, 793, 805, 811; 715/724, 236
See application file for complete search history.

(56) References Cited

U.S. PATENT DOCUMENTS

| | | | |
|---|---|---|---|
| 6,502,102 B1 * | 12/2002 | Haswell et al. | 707/999.102 |
| 7,519,573 B2 * | 4/2009 | Helfman et al. | 707/999.001 |
| 7,543,268 B2 * | 6/2009 | Cherdron et al. | 717/106 |
| 7,693,917 B2 * | 4/2010 | Charlot et al. | 707/804 |
| 7,992,088 B2 * | 8/2011 | Rose | 715/724 |
| 8,156,467 B2 * | 4/2012 | Webster | 717/105 |
| 8,296,671 B2 * | 10/2012 | Narayanan et al. | 715/770 |
| 2002/0101448 A1 * | 8/2002 | Sanderson | 345/762 |
| 2002/0120859 A1 * | 8/2002 | Lipkin et al. | 713/200 |
| 2002/0194221 A1 * | 12/2002 | Strong et al. | 707/513 |
| 2003/0177449 A1 * | 9/2003 | Rose | 715/530 |
| 2003/0229529 A1 * | 12/2003 | Mui et al. | 705/8 |
| 2004/0088374 A1 * | 5/2004 | Webb et al. | 709/218 |
| 2004/0205526 A1 | 10/2004 | Borodovski et al. | |
| 2005/0198029 A1 * | 9/2005 | Pohja et al. | 707/8 |
| 2006/0041589 A1 * | 2/2006 | Helfman et al. | 707/104.1 |
| 2007/0143339 A1 * | 6/2007 | Springett | 707/103 R |
| 2007/0234197 A1 | 10/2007 | Njuki | |
| 2007/0256005 A1 | 11/2007 | Schneider et al. | |
| 2008/0071806 A1 * | 3/2008 | Gaurav et al. | 707/100 |
| 2008/0195968 A1 | 8/2008 | Schacht | |
| 2009/0089752 A1 * | 4/2009 | Tristram | 717/120 |
| 2009/0192847 A1 * | 7/2009 | Lipkin et al. | 705/7 |
| 2009/0276723 A1 * | 11/2009 | Narayanan et al. | 715/769 |
| 2010/0089752 A1 * | 4/2010 | Linford et al. | 204/456 |
| 2010/0138778 A1 * | 6/2010 | Dewan et al. | 715/789 |

FOREIGN PATENT DOCUMENTS

EP 0 886 413 B1 * 6/1998

OTHER PUBLICATIONS

Christoph Aigner—"DBAI Report Communication in a hybrid multi-agent system"—DBAI Technical Report Apr. 2000—(pp. 1-57) (CiteSeer).*

M Unitt and I C Jones—"EDI—The grand daddy of electronic commerce"—BT Technol J vol. 17 No. 3 Jul. 1999—(pp. 17-23).*

(Continued)

Primary Examiner — John E Breene
Assistant Examiner — Anh Ly
(74) Attorney, Agent, or Firm — Lee Law, PLLC; Christopher B. Lee (57) ABSTRACT

A selection of a composite copy command is detected via a computing device executing an application framework. The composite copy command is propagated to each active application associated with the application framework. A composite data element is received from each active application. The composite data element received from each active application is stored into a copy buffer.

12 Claims, 5 Drawing Sheets

(56) References Cited

OTHER PUBLICATIONS

Author Unknown, XML Fragment Interchange, Website/page: http://www.w3.org/TR/xml-fragment.html#terminoiogy, Printed from website Nov. 19, 2009. pp. 1-28, The World Wide Web Consortium (W3C), Published on the World Wide Web.

* cited by examiner

COMPOSITE COPY AND PASTE FOR COMPOSITE USER INTERFACES

BACKGROUND

The present invention relates to data copy and paste. More particularly, the present invention relates to composite copy and paste for composite user interfaces.

A copy function associated with a graphical user interface (GUI) of a conventional computing system allows a user to select individual elements to be copied to a portion of memory known as a clipboard. A copy function may be invoked by a keyboard key combination, such as the control key and the "C" key (e.g., CTRL-C). The individual elements may include a word in text form, a selected portion of text within a document, or other text elements. A paste function allows the user to copy a text element stored in the clipboard to another location, such as a location within the same or another document. A paste function may be invoked by a keyboard key combination, such as the control key and the "V" key (e.g., CTRL-V).

BRIEF SUMMARY

A method includes detecting, via a computing device executing an application framework, a selection of a composite copy command; propagating the composite command to each active application associated with the application framework; receiving a composite data element from each active application; and storing the composite data element received from each active application into a copy buffer.

A system includes a memory; and a processor programmed to: execute an application framework; detect a selection of a composite copy command; propagate the composite copy command to each active application associated with the application framework; receive a composite data element from each active application; and store the composite data element received from each active application into the memory.

A computer program product includes a computer readable storage medium having computer readable program code embodied therewith, the computer readable program code comprising: computer readable program code configured to execute an application framework; computer readable program code configured to detect a selection of a composite copy command; computer readable program code configured to propagate the composite copy command to each active application associated with the application framework; computer readable program code configured to receive a composite data element from each active application; and computer readable program code configured to store the composite data element received from each active application into a copy buffer.

DETAILED DESCRIPTION

The examples set forth below represent the necessary information to enable those skilled in the art to practice the invention and illustrate the best mode of practicing the invention. Upon reading the following description in light of the accompanying drawing figures, those skilled in the art will understand the concepts of the invention and will recognize applications of these concepts not particularly addressed herein. It should be understood that these concepts and applications fall within the scope of the disclosure and the accompanying claims.

The subject matter described herein provides composite copy and paste for composite user interfaces. A selection of a composite copy command is detected via a computing device executing an application framework. The composite command is propagated to each active application associated with the application framework. One or more composite data elements is/are received from each active application. The composite data element(s) received from each active application is/are stored in a copy buffer. In response to detection of a selection of a composite paste command, the stored composite data element(s) are retrieved from the copy buffer and provided to at least one application associated with the composite paste command.

Where more than one active application is associated with the composite copy command, each active application is identified and a composite data element is received from each active application. The separate composite data elements received from each active application are wrapped or hosted within a master data container (e.g., a compound composite data element) and stored to the copy buffer. For example, the data instance may be wrapped or hosted inside of an extensible markup language (XML) data model. Where more than one active application is associated with a composite paste command, one or more composite data elements and/or the compound composite data element, as appropriate, may be supplied to each active application. The active applications may process the provided data element based upon the respective application's ability to consume or convey the data element, or other considerations for the respective applications.

The composite copy and paste for composite user interfaces described herein may be applied to any composite user interface object. For example, an application framework may include a mashup application, a composite web application framework, one or more portlet applications, and a personal computer application framework executing multiple local or remote (e.g., client) applications. An application framework may also be associated with an embedded computing platform or a pervasive computing device (e.g., a mobile device). Many other examples of an application framework are possible and all are considered within the scope of the present subject matter. Copying and pasting underlying data models for applications within any such application frameworks may be performed using the present subject matter.

For purposes of the present description, a composite copy command or a composite paste command operates on one or more data elements. A data element may include data instances. Data instances represent fragments of extensible markup language (XML) or other formatted or structured data. Data instances may be used for data exchange or local data encapsulation, such as within a document. XML data instances may be leveraged for portability using the composite copy and paste command for composite user interfaces associated with the present subject matter.

Data instances may include individual records or entries, such as form data or individual data elements, respectively, captured or rendered in individual form data capture/rendering screens. The composite copy command may copy individual data instances, or portions of individual data instances. The data elements may be associated with one or more applications that are executed locally on a computing device or may be associated with one or more applications that are executed remotely on a server. Additionally, the data elements may be associated with applications that are operated partially on a local computing device and partially on a remote server. Namespaces, whether existing within an application environment, a corporate environment, or created for use with composite copying and pasting, may be used to identify individual data instances or elements.

A data model may include zero or more data instances. A data model may be organized in a flat or a hierarchical manner. A data model may include a single root node/instance with zero or more child data instances. A data model may include document-centric constructs, such as a document object model (DOM) or other construct. Alternatively, a data model may include system-level constructs, such as those utilized within an XML-enabled database.

In the context of mashups, web applications, portlets, and other composite user interfaces, data instance-level definitions may be combined (e.g., aggregated or concatenated) to form a combined data model representative of data within the individual applications that are represented. These combined data models may be represented in any format suitable for a given implementation, such as in an XML data format or other format. As such, a data model may be associated with a single application or multiple applications without departure from the scope of the present subject matter. The present subject matter may further be applied to document types, such as open and proprietary document formats, without departure from the scope of the present subject matter.

A composite copy command may copy individual data instances, individual data models, or portions of individual data instances or data models. A compound document architecture, such as that utilized in the model-view-controller (MVC) approach to user interface development represents one example of an environment where a data model may span multiple documents instances.

A composite paste operation operates upon individual data instances, individual data models, or portions of individual data instances or data models to provide a set of data to one or more active applications. The active application(s) may be provided with individual data elements of a data instance or data model, or may be provided with the entire data instance or data model, as appropriate for a given implementation.

Composite copy operations and composite paste operations may be invoked in a variety of ways. For example, a pop-up menuing structure may be used to present user options for copying and pasting data models and data instances. User selections may be detected and processing of the respective data models and data instances may be performed. Additionally, key combinations may be used and detected to invoke processing of the respective underlying data models and data instances. Other possibilities exist for user interface access to the functionality described herein and all are considered within the scope of the present subject matter.

By providing a composite copy and paste of either an entire data model or specific data instance(s), a number of steps required for client-side data reuse may be reduced. Further, complexity of user interface copy and paste operations may be reduced. Data integrity may be improved while reducing data entry errors. By operating at a data instance or data model level specified in either XML, comma separated values, or in some other appropriate data format, automated copying and pasting of data associated with electronic forms and entire data models may be performed.

For purposes of the present subject matter, a composite copy command and a composite paste command may be considered as data instance operations, where the underlying information associated with a given data instance is processed. As such, underlying information associated with user information components, sections, or elements may be operated upon by the respective composite command. For example, depending upon the underlying document format (e.g., web/portlet application, mashup, or other composite user interface), data may be obtained and processed as a single data instance, multiple discrete data instances, a single data model, multiple data models, or otherwise as appropriate for a given implementation.

Metadata associated with a data model or data instance may be utilized to identify individual data elements within the respective construct. These individual data elements may be extracted by a composite copy command and provided to another application by a composite paste command. As such, the composite copy and composite paste commands may selectively process data models and data instances by use of metadata that defines the organization of the respective constructs.

The following example pseudo code represents an example data model in an XML format.

```
<xmlmodel xmlns:xforms="http://www.w3.org/2003/xforms">
    <xforms:instance xmlns=http://www.w3.org/2003/xforms
    id="Customer_Info">
    <Customer_Name>Lucky Stevens</Customer_Name>
    <Notification_Email>lucky@vegas.com</Notification_Email>
    <Available_Balance>600017.83</Available_Balance>
    <Collected_Balance>17.83</Collected_Balance>
    </xforms:instance>
    <xforms:instance xmlns="http://www.w3.org/2003/xforms"
    id="Transfer_Destination">
    <Receiving_Bank>Bulwark Securities</Receiving_Bank>
    <City_And_State></City_And_State>
    <Name_To_Credit>John Smith</Name_To_Credit>
    <ABA_Number>999999999</ABA_Number>
    <Cusomter_Owned_Account></Cusomter_Owned_Account>
    <Account_To_Credit>1234-55-678</Account_To_Credit>
    <Sub_Account_To_Credit>8832-43-567</
    Sub_Account_To_Credit>
    <Entries_Made_By></Entries_Made_By>
    <Attention>Mary Huang</Attention>
    <Special_Instructions>None.</Special_Instructions>
    </xforms:instance>
</xmlmodel>
```

As can be seen from the above example pseudo code data model, two data instances are represented, a "Customer_Info" data instance and a "Transfer Destination" data instance. For purposes of the present description, each of these data instances may be considered a data element that includes underlying data elements. Further, the entire data model may be copied and pasted using composite copy and paste commands to create a composite copied object that includes data from both data instances. Additionally, individual data elements of underlying data within the data instances may be copied and pasted using composite copy and paste commands. The granularity of the selection may be based upon any criteria appropriate for a given implementation, such as selection of a data field in a form to indicate copying of an underlying data element and selection of a location associated with a form to copy its associated data model including all underlying data instances and data elements. Many possibilities exist for selection of data models, data instances, and data elements, and granularity for composite copying and pasting and all are considered within the scope of the present subject matter.

Regarding the "Customer_Info" data instance, several data elements are associated with the various identifiers. For example, a "Customer_Name" identifier has a data element of "Lucky Stevens" associated with it. Similarly, a "Notification_Email" identifier has a data element lucky@vegas.com associated with it. As can further be seen from the example pseudo code, Lucky Stevens has an available balance of $600,017.83 and a collected balance of $17.83. As described above, the entire "Customer_Info" data instance may be copied and may encapsulate all underlying data elements. Alternatively, individual underlying data elements may be copied. Similar observations and processing may be associated with the "Transfer_Destination" data model and are not described herein for brevity.

It is further understood that certain industries have defined messages that access defined representations of data. In a broad sense, these are often referred to as industry (e.g., enterprise) standards. For example, the insurance industry and other industries have defined certain messaging structures for data access and retrieval. These or other messaging structures may be used to retrieve data for composite copying. These or other messaging structures may also be used to submit composite data or partitioned composite data to applications for paste operations of data instances or data models to the respective applications.

Example application environments within which the present subject matter may be applicable include a rich-client architecture where data resides on a client side (e.g., an application running on a desktop of a computing device or as a browser plug-in), a zero-footprint architecture where data resides on a server side, a single element mashup user interface/interaction flow architecture where data may reside on either a client side or a server side, a client-side data aggregation (e.g., cross-component) mashup interaction flow, and other application environments. It should further be noted that, with an understanding of how data is partitioned, stored, and accessed for a given application environment, the present subject matter may be applied to identify, receive, and combine the respective data elements for processing. As such, the present subject matter may be applied as appropriate within a given implementation of multiple application environments.

Composite copy and paste operations may further implement role-based access to copy and paste functionality. As such, only authorized users may be given access to composite copy and composite paste functions as appropriate for a given implementation. Further, audit or event trails may be maintained to provide traceability of aggregate copy and paste functionality. The composite copy and paste operations may further be enabled within specific applications, such as specific mashups or other composite user interfaces components, and disabled in other applications. Data access may be further restricted to client-side access, server-side access, or both as appropriate for a given implementation.

Data elements may further be selected for copying from separate composite data elements based upon configured selection criteria. For example, where multiple data elements are identified with similar names within multiple data objects, a time stamp associated with each data element may be determined and a newer of the two data elements may be received for composite copying and pasting. Further, a master data source application (e.g., a primary application in a multi-application environment) may be identified as an application from which to select information where a potential conflict between data elements is identified. A user identifier (ID) associated with each of the two data elements and a highest priority between the user identifiers may be determined (e.g., data associated with a department manager or administrator may be prioritized over other data users), and data associated with the identified highest priority user may be selected. Many other possibilities exist for composite copying and composite pasting and all are considered within the scope of the present subject matter.

The composite copy and paste for composite user interfaces described herein may be performed in real time to allow prompt copying and pasting operations of complex data objects for composite user interfaces. For purposes of the present description, real time shall include any time frame of sufficiently short duration as to provide reasonable response time for information processing acceptable to a user of the subject matter described. Additionally, the term "real time" shall include what is commonly termed "near real time"—generally meaning any time frame of sufficiently short duration as to provide reasonable response time for on-demand information processing acceptable to a user of the subject matter described (e.g., within a portion of a second or within a few seconds). These terms, while difficult to precisely define are well understood by those skilled in the art.

Figure 1:
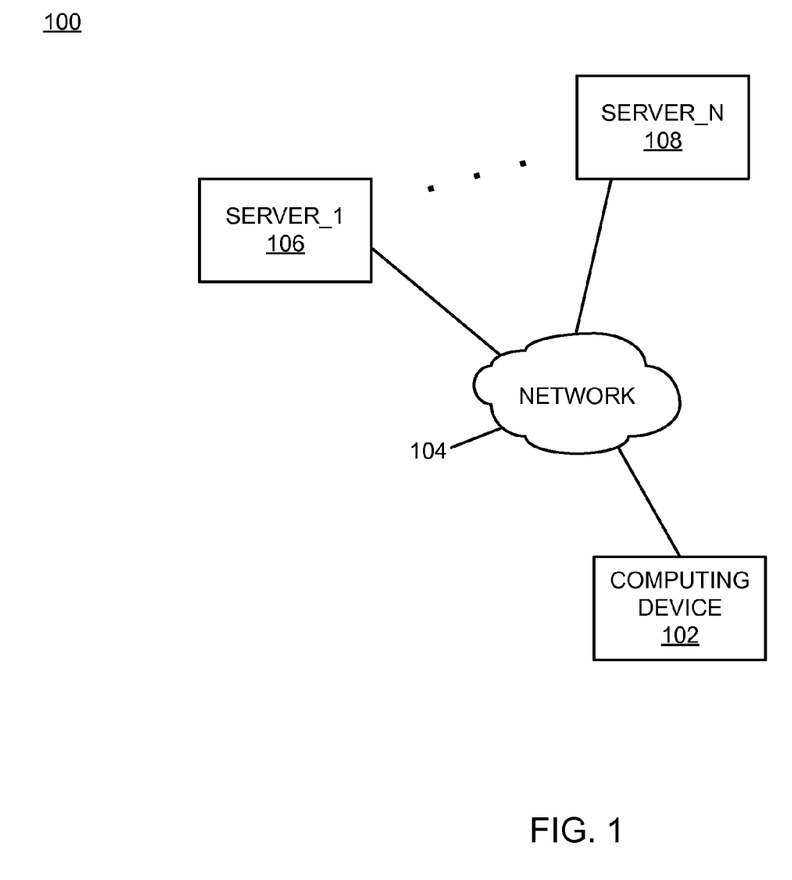
FIG. 1 is a block diagram of an example of an implementation of a system for composite copy and paste for composite user interfaces according to an embodiment of the present subject matter.

FIG. 1 is a block diagram of an example of an implementation of a system 100 for composite copy and paste for composite user interfaces. A computing device 102 communicates via a network 104 with a server_1 106 through a server_N 108. The server_1 106 through the server_N 108 may include any server or device that provides either an application interface or data storage for an application. For example, the server_1 106 through the server_N 108 may include web servers, portal servers, servers from which content for mashups may be accessed, or any other form of content or data servers.

As will be described in more detail below in association with FIG. 2 through FIG. 5, the computing device 102 provides automated composite copy and paste for composite user interfaces. The automated composite copy and paste for composite user interfaces is based upon accessing one or more data objects associated with an underlying data instance, data model, or a portion of an underlying data instance or data model associated with one or more single or composite applications. The accessed data object(s) are stored to a copy buffer and may be provided to one or more single or composite applications as a unit.

It should be noted that the computing device 102 may be a portable computing device, either by a user's ability to move the computing device 102 to different locations, or by the computing device 102's association with a portable platform, such as a plane, train, automobile, or other moving vehicle. It should also be noted that the computing device 102 may be any computing device capable of processing information as described above and in more detail below. For example, the computing device 102 may include devices such as a personal computer (e.g., desktop, laptop, palm, etc.) or a handheld device (e.g., cellular telephone, personal digital assistant (PDA), email device, music recording or playback device, etc.), or any other device capable of processing information as described in more detail below.

The network 104 may include any form of interconnection suitable for the intended purpose, including a private or public network such as an intranet or the Internet, respectively, direct inter-module interconnection, dial-up, wireless, or any other interconnection mechanism capable of interconnecting the respective devices.

Figure 2:
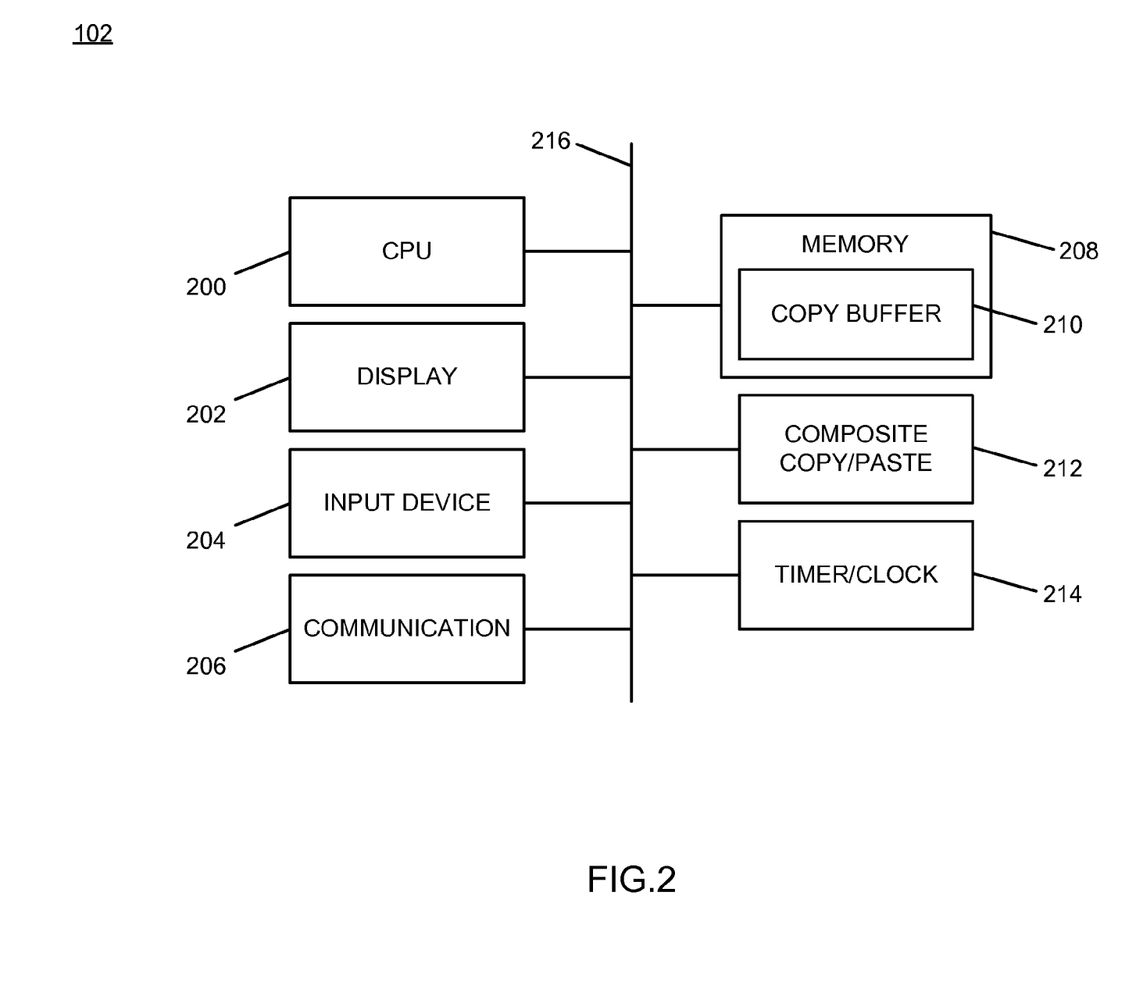
FIG. 2 is a block diagram of an example of an implementation of a computing device for performing automated composite copy and paste for composite user interfaces according to an embodiment of the present subject matter.

FIG. 2 is a block diagram of an example of an implementation of the computing device 102 for performing automated composite copy and paste for composite user interfaces. A central processing unit (CPU) 200 provides computer instruction, execution, computation, and other capabilities within the computing device 102. A display 202 provides visual information to a user of the computing device 102 and an input device 204 provides input capabilities for the user.

The display 202 may include any display device, such as a cathode ray tube (CRT), liquid crystal display (LCD), light emitting diode (LED), projection, touchscreen, or other display element or panel. The input device 204 may include a computer keyboard, a keypad, a mouse, a pen, a joystick, or any other type of input device by which the user may interact with and respond to information on the display 202.

A communication module 206 provides interconnection capabilities that allow the computing device 102 to communicate with other modules within the system 100, such as the server_1 106 through the server_N 108, to access and store data elements. The communication module 206 may include any electrical, protocol, and protocol conversion capabilities useable to provide the interconnection capabilities. Though the communication module 206 is illustrated as a component-level module for ease of illustration and description purposes, it should be noted that the communication module 206 may include any hardware, programmed processor(s), and memory used to carry out the functions of the communication module 206 as described above and in more detail below. For example, the communication module 206 may include additional controller circuitry in the form of application specific integrated circuits (ASICs), processors, antennas, and/or discrete integrated circuits and components for performing communication and electrical control activities associated with the communication module 206. Additionally, the communication module 206 may include interrupt-level, stack-level, and application-level modules as appropriate. Furthermore, the communication module 206 may include any memory components used for storage, execution, and data processing for performing processing activities associated with the communication module 206. The communication module 206 may also form a portion of other circuitry described without departure from the scope of the present subject matter.

A memory 208 includes a copy buffer storage area 210 that stores copied data elements (e.g., data instances, data models, and portions of data instances and/or data models) within the computing device 102. As will be described in more detail below, data elements stored within the copy buffer storage area 210 are used to provide composite data elements to applications within an application framework as a manageable unit.

It is understood that the memory 208 may include any combination of volatile and non-volatile memory suitable for the intended purpose, distributed or localized as appropriate, and may include other memory segments not illustrated within the present example for ease of illustration purposes. For example, the memory 208 may include a code storage area, a code execution area, and a data area without departure from the scope of the present subject matter.

A composite copy/paste module 212 is also illustrated. The composite copy/paste module 212 provides data element processing capabilities for the computing device 102, as described above and in more detail below. The composite copy/paste module 212 implements the automated composite copy and paste for composite user interfaces of the computing device 102.

Though the composite copy/paste module 212 is illustrated as a component-level module for ease of illustration and description purposes, it should be noted that the composite copy/paste module 212 may include any hardware, programmed processor(s), and memory used to carry out the functions of this module as described above and in more detail below. For example, the composite copy/paste module 212 may include additional controller circuitry in the form of application specific integrated circuits (ASICs), processors, and/or discrete integrated circuits and components for performing communication and electrical control activities associated with the respective devices. Additionally, the composite copy/paste module 212 may also include interrupt-level, stack-level, and application-level modules as appropriate. Furthermore, the composite copy/paste module 212 may include any memory components used for storage, execution, and data processing for performing processing activities associated with the composite copy/paste module 212.

It should also be noted that the composite copy/paste module 212 may form a portion of other circuitry described without departure from the scope of the present subject matter. Further, the composite copy/paste module 212 may alternatively be implemented as an application stored within the memory 208. In such an implementation, the composite copy/paste module 212 may include instructions executed by the CPU 200 for performing the functionality described herein. The CPU 200 may execute these instructions to provide the processing capabilities described above and in more detail below for the computing device 102. The composite copy/paste module 212 may form a portion of an interrupt service routine (ISR), a portion of an operating system, a portion of a browser application, or a portion of a separate application without departure from the scope of the present subject matter.

A timer/clock module 214 is illustrated and used to determine timing and date information, such as timestamp information associated with data elements or individual items of data associated with data elements, as discussed above, to allow processing for selection of data elements/items where multiple items have similar names. As described above, a newer element may be selected for copying where multiple elements are similarly named. As such, the composite copy/paste module 212 may utilize information derived from the timer/clock module 214 for information processing activities, such as the composite copy and paste for composite user interfaces.

The CPU 200, the display 202, the input device 204, the communication module 206, the memory 208, the copy/paste module 212, and the timer/clock module 214 are interconnected via an interconnection 216. The interconnection 216 may include a system bus, a network, or any other interconnection capable of providing the respective components with suitable interconnection for the respective purpose.

While the computing device 102 is illustrated with and has certain components described, other modules and components may be associated with the computing device 102 without departure from the scope of the present subject matter. Additionally, it should be noted that, while the computing device 102 is described as a single device for ease of illustration purposes, the components within the computing device 102 may be co-located or distributed and interconnected via a network without departure from the scope of the present subject matter. For a distributed arrangement, the display 202 and the input device 204 may be located at a point of sale device, kiosk, or other location, while the CPU 200 and memory 208 may be located at a local or remote server. Many other possible arrangements for components of the computing device 102 are possible and all are considered within the scope of the present subject matter. Accordingly, the computing device 102 may take many forms and may be associated with many platforms.

Figure 3:
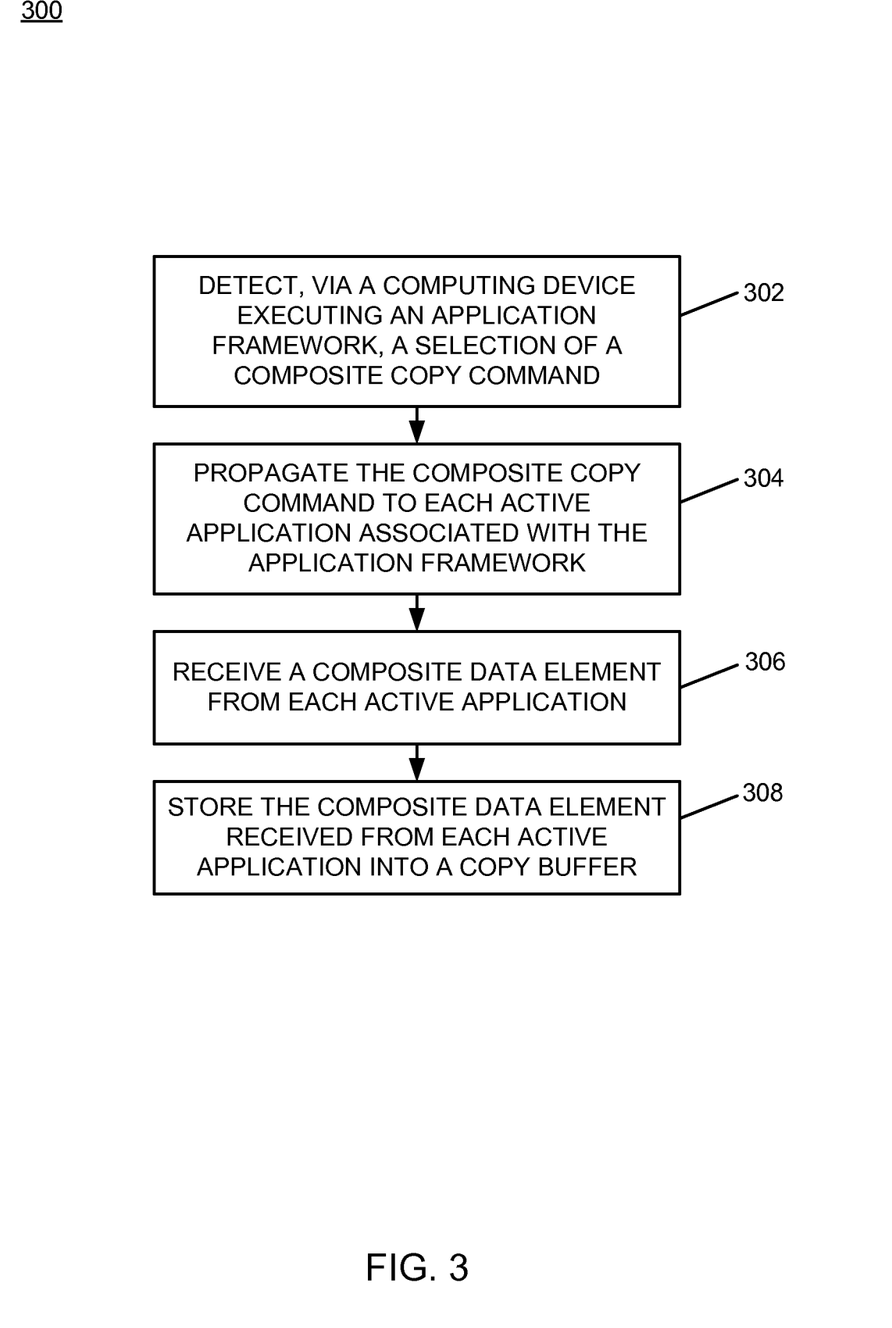
FIG. 3 is a flow chart of an example of an implementation of a process for automated composite copying of data elements for composite user interfaces according to an embodiment of the present subject matter.
Figure 4:
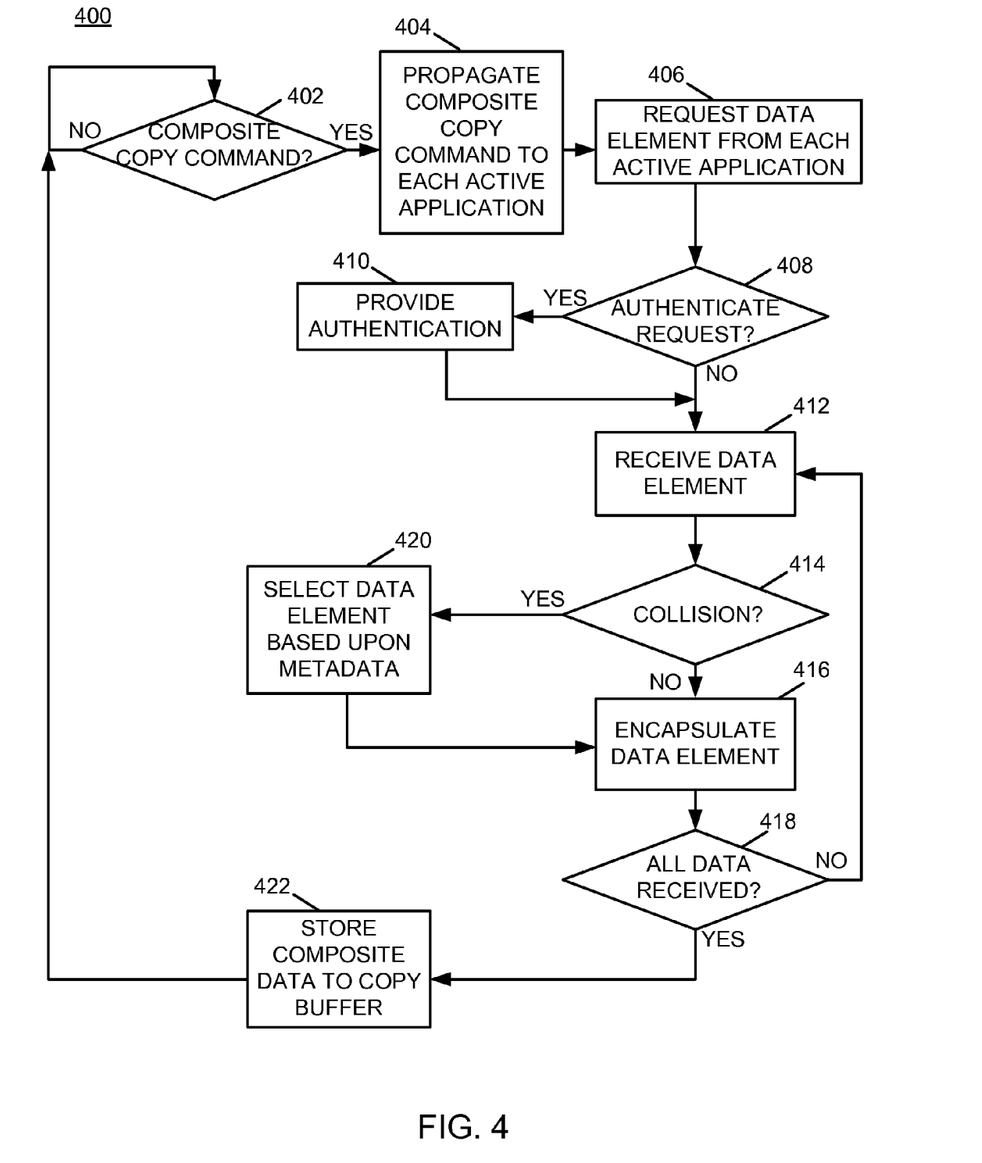
FIG. 4 is a flow chart of an example of an implementation of a process for composite copying of data elements for composite user interfaces according to an embodiment of the present subject matter.
Figure 5:
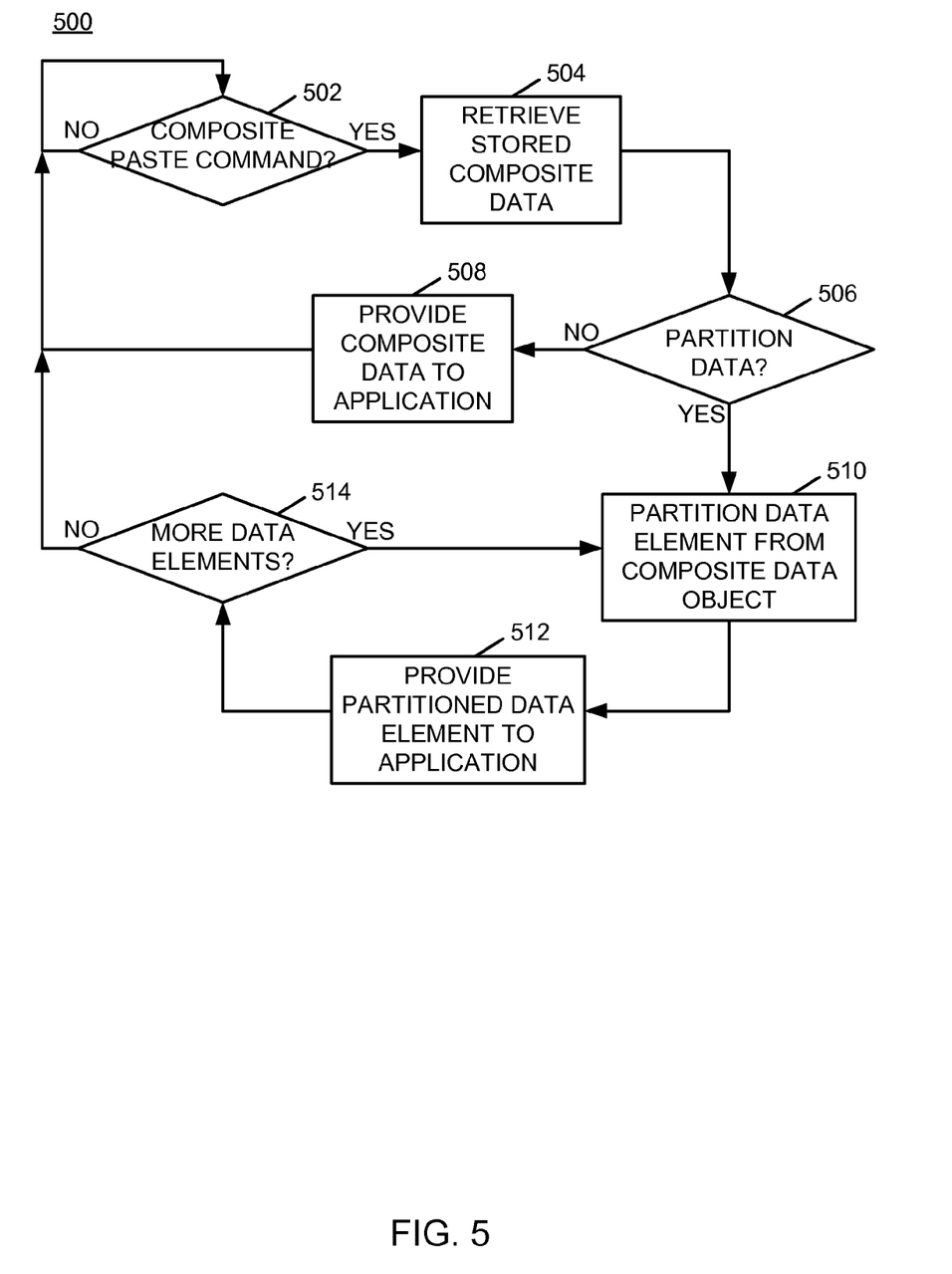
FIG. 5 is a flow chart of an example of an implementation of a process for composite pasting of data elements for composite user interfaces according to an embodiment of the present subject matter.

FIG. 3 through FIG. 5 below describe example processes that may be executed by devices, such as the computing device 102, to perform the automated composite copy and paste for composite user interfaces associated with the present subject matter. Many other variations on the example processes are possible and all are considered within the scope of the present subject matter. The example processes may be performed by modules, such as the copy/paste module 212 and/or executed by the CPU 200, associated with such devices. It should be noted that time out procedures and other error control procedures are not illustrated within the example processes described below for ease of illustration purposes. However, it is understood that all such procedures are considered to be within the scope of the present subject matter.

FIG. 3 is a flow chart of an example of an implementation of a process 300 for automated composite copying of data elements for composite user interfaces. At block 302, the process 300 detects, via a computing device executing an application framework, a selection of a composite copy command. At block 304, the process 300 propagates the composite copy command to each active application associated with the application framework. At block 306, the process 300 receives a composite data element from each active application. At block 308, the process 300 stores the composite data element received from each active application into a copy buffer.

FIG. 4 is a flow chart of an example of an implementation of a process 400 for composite copying of data elements for composite user interfaces. The process 400 may be associated with any application framework, including, among other application framework types, a mashup application, a composite web application framework, a portlet application, a personal computer application framework, and an embedded computing application framework.

At decision point 402, the process 400 makes a determination as to whether a composite copy command has been detected. As described above, a composite copy command may be detected via a selection associated with a pop-up menuing structure that presents user options for copying and pasting data models and data instances. Additionally, key combinations may be used and detected to invoke processing of underlying data models and data instances associated with one or more applications. Other possibilities exist for user interface access to the functionality described herein and all are considered within the scope of the present subject matter.

When a determination is made that a composite copy command has been detected, the process 400 propagates the composite copy command to each active application associated with the application framework at block 404. At block 406, the process 400 requests data from each active application. It is understood that data may be received from active applications, either in association with an authentication request or without an authentication request. It should further be noted that the request for data at block 406 may include a request for an extensible markup language (XML) data instance or an XML data model from each active application. Additionally, receiving the data from each active application may include receiving the requested XML data instance or the requested XML data model from each active application. Further, fragments or portions of an underlying data element may be requested and received without departure from the scope of the present subject matter.

At decision point 408, the process 400 makes a determination as to whether to an authentication request has been received in response to the request for data from any of the active applications. As described above, the processing described herein may be provided with configurable options for allowing only authorized users to have access to composite copy and composite paste functions. As such, each individual application may be configured to either require authentication or to allow access by any entity or computing device. In response to determining that an authentication request has been received from at least one of the active applications, the process 400 provides the requested authentication, such as a user identifier or other authentication criterion, to the requesting active application at block 410.

When a determination is made at decision point 408 that no authentication request has been received (e.g., data is received without an authentication request), or that data has been received upon providing the requested authentication at block 410, the process 400 receives a first data element at block 412. It should be noted that the process 400 may receive multiple data elements from each active application without departure from the present subject matter.

At decision point 414, the process 400 makes a determination as to whether a data collision has occurred with respect to the received data element(s) and any other received data element(s). A collision may occur, for example, when a same instance identifier (ID) is associated with multiple data elements. Additionally, a collision may occur when a same namespace is associated with multiple data elements. Regardless of the source of the collision, the process 400 merges the data elements together based upon metadata resolution for selection of one of the data elements associated with the collision, as described in more detail below. It is noted that it is assumed for purposes of the present example, that there will not be a collision for the first data element(s) received from the first active application. As such, a discussion of processing associated with an affirmative determination regarding a collision shall be deferred and described further below.

When a determination is made at decision point 414 that no collision has occurred, the process 400 encapsulates the received data element(s) into a compound composite data element at block 416. At decision point 418, the process 400 makes a determination as to whether all requested data has been received. When a determination is made that all requested data has not been received, the process 400 returns to block 412 to receive the next data element(s) and iterates as described above for receipt of additional data elements. As such, the process 400 provides for composite copying from one or more active applications.

Returning to the description of decision point 414, when a determination is made that a received data element has caused a collision with another received data element, the process 400 selects either the previously encapsulated data element or the received data element based upon metadata associated with the respective data elements at block 420. For example, the process 400 may make a determination to select one of the data elements based upon a timestamp resolution of timestamp metadata, based upon determination of a master data source (e.g., a configured master data source application), or based upon a user-data priority (e.g., a manager, administrator, or other user priority). It should further be noted that metadata may be configured to instruct the process 400 to prompt a user for resolution in the case of a collision. In such an implementation, a user may be prompted to resolve the collision at block 420, such as by displaying conflicting element identifiers and associated data within pop-up dialog, and a user selection may be detected including an indication of which of the conflicting data elements to select to resolve the collision. Many other possibilities exist for resolution of data collisions based upon metadata associated with the respective data elements and all are considered within the scope of the present subject matter. Upon completion of the selection of either the previously encapsulated data element or the received data element(s) based upon metadata associated with the respective data elements at block 420, the process 400 continues to block 416 and encapsulates the data element into a compound composite data element, and iterates as described above.

Returning to the description of decision point 418, when a determination is made that all data has been received and encapsulated, the process 400 stores the composite data element to a copy buffer, such as the copy buffer storage area 210, at block 422, and returns to decision point 402 to await a new composite copy command.

As such, the process 400 provides for user authentication for composite copy commands. The process 400 also provides for encapsulation and various metadata-based collision resolution options for creating composite data elements. Many other variations on the processing described are possible and all are considered within the scope of the present subject matter.

FIG. 5 is a flow chart of an example of an implementation of a process 500 for composite pasting of data elements for composite user interfaces. At decision point 502, the process 500 makes a determination as to whether a composite paste command has been detected. As with the composite copy command associated with the process 400 of FIG. 4, the composite paste command associated with the process 500 may be detected via a selection associated with a pop-up menuing structure that presents user options for copying and pasting data models and data instances. Additionally, key combinations may be used and detected to invoke processing of underlying data models and data instances associated with one or more applications. Other possibilities exist for user interface access to the functionality described herein and all are considered within the scope of the present subject matter.

When a determination is made that a composite paste command has been detected, the process 500 retrieves a stored composite data element from the copy buffer, such as the copy buffer storage area 210, at block 504. At decision point 506, the process 500 makes a determination as to whether to partition the composite data element or whether to provide the composite data element as one object to one or more target applications associated with the composite paste command. When a determination is made not to partition the composite data element, the process 500 provides the composite data element to at least one application associated with the composite paste command at block 508. The process 500 returns to decision point 502 to await another composite paste command.

When a determination at decision point 506 to partition the composite data element, the process 500 partitions a data element from the composite data element at block 510. At block 512, the process 500 provides the partitioned data element to at least one application associated with the composite paste command. At decision point 514, the process 500 makes a determination as to whether additional data elements are associated with the composite data element. When a determination is made that additional data elements are associated with the composite data element, the process 500 returns to block 510 to partition another data element from the composite data element and continues iterating as described above for the remaining data elements. When a determination is made at decision point 514 that no additional data elements are associated with the composite data element, the process 500 returns to decision point 502 to await another composite paste command.

As such, the process 500 provides for retrieval of stored composite data elements. The process 500 further provides the encapsulated composite data element to one or more applications associated with the composite paste command. Alternatively, the process 500 partitions data elements from the encapsulated composite data element and provides the partitioned data elements individually to one or more applications associated with the composite paste command. It should further be noted that partitioned data elements may be provided to different applications without departure from the scope of the present subject matter. It should further be noted that the example process 400 of FIG. 4 and the example process 500 of FIG. 5 may be combined to form a single process, modified, or otherwise changed without departure from the scope of the present subject matter.

As described above in association with FIG. 1 through FIG. 5, the example systems and processes provide composite copy and paste for composite user interfaces. Many other variations and additional activities associated with composite copy and paste for composite user interfaces are possible and all are considered within the scope of the present subject matter.

Those skilled in the art will recognize, upon consideration of the above teachings, that certain of the above examples are based upon use of a programmed processor, such as the CPU 200. However, the invention is not limited to such example embodiments, since other embodiments could be implemented using hardware component equivalents such as special purpose hardware and/or dedicated processors. Similarly, general purpose computers, microprocessor based computers, micro-controllers, optical computers, analog computers, dedicated processors, application specific circuits and/or dedicated hard wired logic may be used to construct alternative equivalent embodiments.

As will be appreciated by one skilled in the art, aspects of the present invention may be embodied as a system, method or computer program product. Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon.

Any combination of one or more computer readable medium(s) may be utilized. The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: an electrical connection having one or more wires, a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electro-magnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer-readable storage medium that can direct a computer or other programmable data processing apparatus to function in a particular manner, such that the instructions stored in the computer-readable storage medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

The flowchart and block diagrams in the Figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output or I/O devices (including but not limited to keyboards, displays, pointing devices, etc.) can be coupled to the system either directly or through intervening I/O controllers.

Network adapters may also be coupled to the system to enable the data processing system to become coupled to other data processing systems or remote printers or storage devices through intervening private or public networks. Modems, cable modems and Ethernet cards are just a few of the currently available types of network adapters.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

The corresponding structures, materials, acts, and equivalents of all means or step plus function elements in the claims below are intended to include any structure, material, or act for performing the function in combination with other claimed elements as specifically claimed. The description of the present invention has been presented for purposes of illustration and description, but is not intended to be exhaustive or limited to the invention in the form disclosed. Many modifications and variations will be apparent to those of ordinary skill in the art without departing from the scope and spirit of the invention. The embodiment was chosen and described in order to best explain the principles of the invention and the practical application, and to enable others of ordinary skill in the art to understand the invention for various embodiments with various modifications as are suited to the particular use contemplated.

What is claimed is:

1. A method, comprising:
detecting, via a computing device executing an application framework, a selection of a composite copy command, where the application framework comprises one of a mashup application, a composite web application framework, a portlet application, a personal computer application framework, and an embedded computing application framework;
propagating the composite copy command to each active executing application associated with the application framework;
receiving a composite data element from each active executing application;
determining that two of the composite data elements received from two of the active executing applications each comprise an identical data element identifier;
selecting one of the two composite data elements based upon metadata associated with each of the two composite data elements; and
storing the composite data element received from each active executing application into a copy buffer, comprising:
encapsulating the composite data element received from each active executing application into a compound composite data element;
storing the compound composite data element into the copy buffer; and
storing the selected composite data element with the compound composite data element into the copy buffer.

2. The method of claim 1, where receiving the composite data element from each active executing application comprises receiving one of an extensible markup language (XML) data instance and an XML data model from each active executing application.

3. The method of claim 1, where the composite data element received from each active executing application comprises one of a data instance and a data model and encapsulating the composite data element received from each active executing application comprises one of:
selecting individual data elements from one of the data instance and the data model received from each active executing application and forming the individual data elements into the compound composite data element; and
concatenating one of the data instance and the data model received from each active executing application into the compound composite data element.

4. The method of claim 1, further comprising:
detecting a selection of a composite paste command;
retrieving the stored composite data element from the copy buffer; and
providing the composite data element to at least one active executing application associated with the composite paste command.

5. A system, comprising:
a memory; and
a processor programmed to:
execute an application framework, where the application framework comprises one of a mashup application, a composite web application framework, a portlet application, a personal computer application framework, and an embedded computing application framework;
detect a selection of a composite copy command;
propagate the composite copy command to each active executing application associated with the application framework;
receive a composite data element from each active executing application;
determine that two of the composite data elements received from two of the active executing applications each comprise an identical data element identifier;
select one of the two composite data elements based upon metadata associated with each of the two composite data elements; and
store the composite data element received from each active executing application into the memory, the processor being programmed to:
encapsulate the composite data element received from each active executing application into a compound composite data element;
store the compound composite data element into the memory; and
store the selected composite data element with the compound composite data element into the memory.

6. The system of claim 5, where, in being programmed to receive the composite data element from each active executing application, the processor is programmed to receive one of an extensible markup language (XML) data instance and an XML data model from each active executing application.

7. The system of claim 5, where the composite data element received from each active executing application comprises one of a data instance and a data model and in being programmed to encapsulate the composite data element received from each active executing application, the processor is programmed to one of:
select individual data elements from one of the data instance and the data model received from each active executing application and form the individual data elements into the compound composite data element; and
concatenate one of the data instance and the data model received from each active executing application into the compound composite data element.

8. The system of claim 5, where the processor is further programmed to:
detect a selection of a composite paste command;
retrieve the stored composite data element from the memory; and
provide the composite data element to at least one active executing application associated with the composite paste command.

9. A computer program product, comprising:
a non-transitory computer readable storage medium having computer readable program code embodied therewith, the computer readable program code comprising:
computer readable program code configured to execute an application framework, where the application framework comprises one of a mashup application, a composite web application framework, a portlet application, a personal computer application framework, and an embedded computing application framework;

computer readable program code configured to detect a selection of a composite copy command;

computer readable program code configured to propagate the composite copy command to each active executing application associated with the application framework;

computer readable program code configured to receive a composite data element from each active executing application;

computer readable program code configured to determine that two of the composite data elements received from two of the active executing applications each comprise an identical data element identifier;

computer readable program code configured to select one of the two composite data elements based upon metadata associated with each of the two composite data elements; and computer readable program code configured to store the composite data element received from each active executing application into a copy buffer, comprising:

computer readable program code configured to encapsulate the composite data element received from each active executing application into a compound composite data element;

computer readable program code configured to store the compound composite data element into the copy buffer; and computer readable program code configured to store the selected composite data element with the compound composite data element into the copy buffer.

10. The computer program product of claim 9, where the computer readable program code configured to receive the composite data element from each active executing application comprises computer readable program code configured to receive one of an extensible markup language (XML) data instance and an XML data model from each active executing application.

11. The computer program product of claim 9, where the composite data element received from each active executing application comprises one of a data instance and a data model and the computer readable program code configured to encapsulate the composite data element received from each active executing application comprises one of:

computer readable program code configured to select individual data elements from one of the data instance and the data model received from each active executing application and form the individual data elements into the compound composite data element; and computer readable program code configured to concatenate one of the data instance and the data model received from each active executing application into the compound composite data element.

12. The computer program product of claim 9, further comprising:

computer readable program code configured to detect a selection of a composite paste command;

computer readable program code configured to retrieve the stored composite data element from the copy buffer; and computer readable program code configured to provide the composite data element to at least one active executing application associated with the composite paste command.

* * * * *